United States Patent [19]
Hoffman

[11] Patent Number: 5,720,407
[45] Date of Patent: Feb. 24, 1998

[54] FOAM CAP FOR EVAPORATIVE COOLERS

[76] Inventor: William D. Hoffman, P.O. Box 1626, Las Cruces, N. Mex. 88004

[21] Appl. No.: 636,551

[22] Filed: Apr. 23, 1996

Related U.S. Application Data

[63] Continuation of Ser. No. 210,731, Mar. 17, 1994, Pat. No. 5,509,565, which is a continuation of Ser. No. 49,675, Apr. 16, 1993, abandoned.

[51] Int. Cl.⁶ ............................................. B65D 43/08
[52] U.S. Cl. ..................... 220/215; 220/306; 220/356; 220/444
[58] Field of Search ................................. 220/378, 215, 220/306, 308, 356, 357, 327, 444; 62/304; 261/DIG. 3, DIG. 41

[56] References Cited

U.S. PATENT DOCUMENTS

| | | | |
|---|---|---|---|
| 2,365,231 | 4/1944 | Wegman | 220/215 |
| 2,803,368 | 12/1957 | Koch | 220/215 |
| 4,190,155 | 2/1980 | Higley | 220/444 |
| 4,376,082 | 3/1983 | Heck. | |
| 4,498,912 | 2/1985 | Wagner | 55/233 |
| 4,541,545 | 9/1985 | Beattie et al. | 220/444 |
| 4,632,279 | 12/1986 | Donaldson et al. . | |
| 4,643,327 | 2/1987 | Campbell | 220/215 |
| 4,721,227 | 1/1988 | Hughes et al. | 220/215 |
| 4,732,012 | 3/1988 | Thorpe | 62/304 |
| 4,747,505 | 5/1988 | Hansen | 220/4 R |
| 4,838,038 | 6/1989 | Uecker et al. . | |
| 5,219,007 | 6/1993 | Ebbing | 220/327 |
| 5,509,565 | 4/1996 | Hoffman . | |

*Primary Examiner*—Stephen J. Castellano
*Attorney, Agent, or Firm*—Jeffrey D. Myers; Deborah A. Peacock; Donovan F. Duggan

[57] ABSTRACT

A unitary, one-piece cooler cap for evaporative coolers comprising an integral shell and molded insulation. The shell provides seating and mounting means, as well as a mold cavity.

17 Claims, 1 Drawing Sheet

FOAM CAP FOR EVAPORATIVE COOLERS

This is a continuation of application Ser. No. 08/210,731 filed on Mar. 17, 1994, now U.S. Pat. No. 5,509,565, which is a continuation of Ser. No. 08/049,675 filed on Apr. 16, 1993, now abandoned.

BACKGROUND OF THE INVENTION

1. Field of the Invention (Technical Field)

The invention relates to insulated plastic caps for evaporative coolers, and a method of making such caps.

2. Background Art

The relatively arid climate and dry atmosphere of the desert Southwest permits the widespread use of relatively simple cooling devices termed evaporative coolers. Evaporative coolers pump relatively dry atmospheric air through water-soaked pads into the spaces to be cooled. The evaporation of water together with the increase in humidity results in cooled, humid air being pumped to the spaces.

Structurally, evaporative coolers normally comprise vented metallic housings containing a pump, fan, water reservoir and pads. They are normally mounted externally on the spaces to be cooled, and are thus subject to direct solar heating. Such heating greatly reduces the efficiency and cooling effect of evaporative coolers. Accordingly, shielding and insulating devices for evaporative cooler housings exist in the prior art.

U.S. Pat. No. 4,498,912, entitled Sunscreen Cover Apparatus for an Evaporative Cooler, to Wagner, issued Feb. 17, 1985, discloses top and side reflective panels covering and shielding an evaporative cooler from the direct rays of the sun. The covering panels allow the passage of air, but filter out undesirable particulate material.

U.S. Pat. No. 4,838,038, entitled Temperature Insulating Apparatus for Improving the Efficiency of an Evaporative Cooling Unit, to Vecker, et al., issued Jun. 13, 1989, also discloses a device disposed above the evaporative cooler comprising a reflective layer and an insulative member. Reduction of solar heat is effected by reflection and insulation of the cooler from the direct rays of the sun.

U.S. Pat. No. 4,747,505, entitled Unitized Cabinet Design, to Hansen, issued May 31, 1988, discloses an air handling enclosure comprising a plurality of enclosure panels, some of which are insulated.

U.S. Pat. No. 4,732,012, entitled Energy Efficient Evaporative Cooler Cover Apparatus, to Thorpe, issued Mar. 22, 1988, discloses an overhanging insulated top cover portion and spaced insulated side panels. The side panels can be positioned a predetermined distance away from the cooler by means of brackets.

Perhaps most relevant is U.S. Pat. No. 4,376,082, entitled Insulative Cap for Evaporative Cooler, to Heck, issued Mar. 8, 1983. Heck also discloses an insulating cap for evaporative coolers. The insulating portion is loosely set within a protective covering, which is secured to the cooler housing.

The prior art thus fails to disclose evaporative cooler caps that have molded insulation integrally formed therewith.

SUMMARY OF THE INVENTION (DISCLOSURE OF THE INVENTION)

In accordance with the present invention there is provided an integral one-piece insulating cap for evaporative coolers. The cap comprises a top portion, a stepped portion and a mold portion. The stepped portion further comprises mountings for mounting the cap on the cooler, and the mold portion comprises a mold for integrally molding thermal insulation therein.

The invention further comprises a liner, and bolts, clamps or screws for mounting the cap. The shell portion of the cap may further comprise ultraviolet inhibitors.

In accordance with the present invention, there is provided a method of making an integral one-piece insulation cap for evaporative coolers comprising the step of providing a shell comprising a top portion, a stepped portion and a mold portion. The method of making the invention further comprises providing mountings for securing the cap to the cooler, and molding thermal insulation into the mold portion. The method of making the invention further comprises the steps of providing a liner and a plastic insulating shell. The step of providing a plastic insulating shell further comprises the step of providing a plastic insulating shell having ultraviolet inhibitors therein, and may comprise a reflective coating. The step of providing mountings on the stepped portion comprises the step of providing fastener holes, and the step of molding thermal insulation comprises the step of injecting polyurethane foam insulation into the mold portion of the shell.

In accordance with the present invention there is further provided a unitary one-piece cap for an evaporative cooler comprising an integral shell and thermal insulation molded thereto. The shell comprises a top portion, a stepped portion and a mold portion. The top portion comprises a light-reflective material, and the stepped portion comprises seating and securing means. The mold portion comprises a cavity and a liner and thermal insulation.

An object of the invention is to provide an evaporative cooler cap of unitary construction.

Another object of the invention is the provision of an evaporative cooler cap with integral shell and insulating portions.

Yet another object of the invention is the provision of an evaporative cooler cap shell providing seating and insulation mold functions.

An advantage of the present invention is its ease of manufacture and low cost.

Another advantage of the present invention is its compactness and ease of installation.

Yet another advantage of the invention is the provision of a top-mounted evaporative cooler cap.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
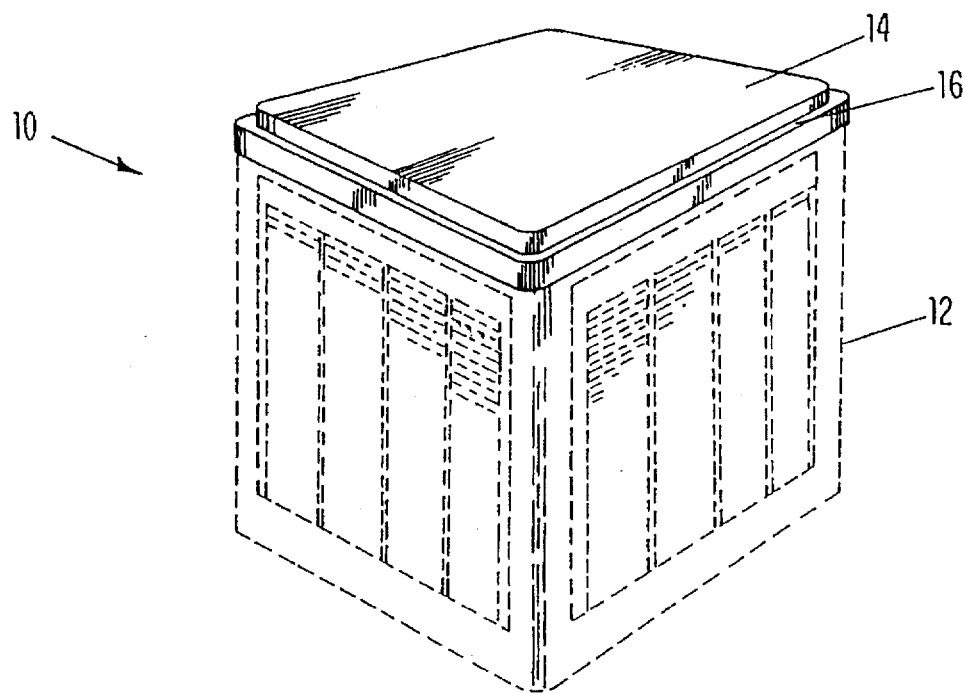
FIG. 1 is a perspective view of the cooler cap of the invention mounted upon an evaporative cooler.
Figure 2:
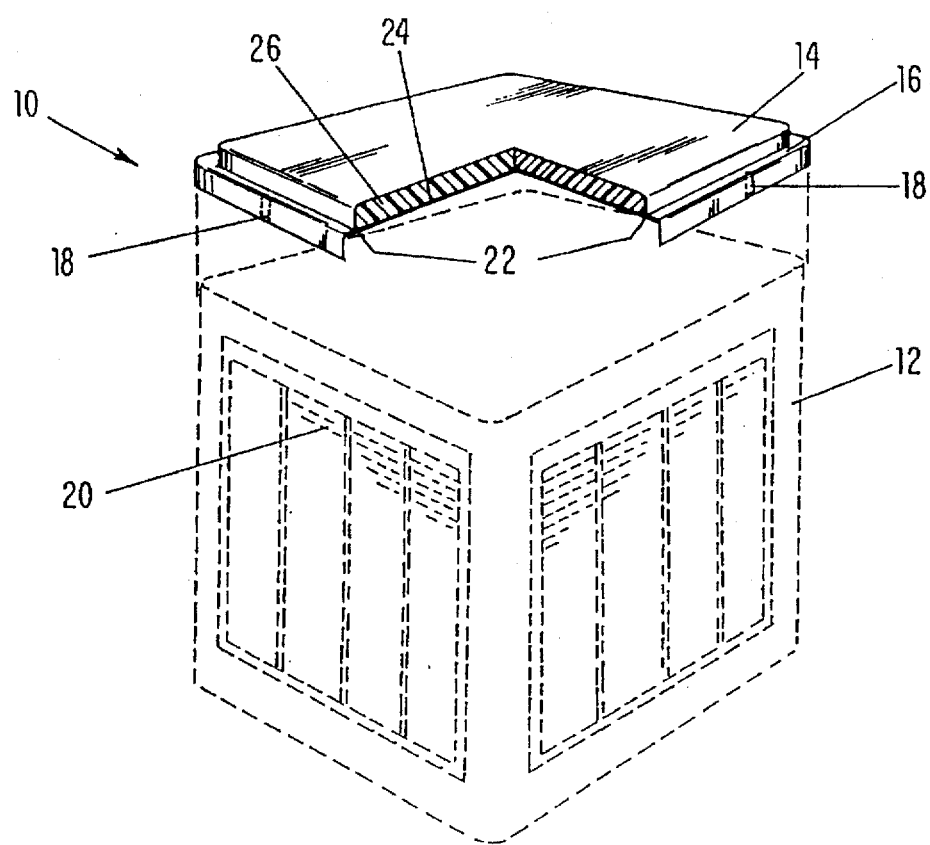
FIG. 2 is an elevated cross-sectional view of the cooler cap of the invention.

Reference is made to FIGS. 1–2 which show the preferred cooler cap of the invention. As shown therein, cap 10 comprises a one-piece molded plastic shell adapted to be mounted to cooler 12. Cap 10 may further compositionally comprise any of several suitable plastics, for example, thermoplastic and thermosetting plastics including polyethylene, polyisocyanurate, ABS, vinyl, glass fiber and the like. Cap 10 is formed by vacuum molding, rotor molding or by any other molding process known to the art. Ultraviolet inhibitors may be incorporated into the shell.

Top portion 14 of cap 10 may further comprise coated light colored or reflective material thereon, as well as match cooler 12 in color. Cap 10 may, itself be comprised of light colored, cooler colored, or reflective plastic material. Further, top portion 14 may comprise strengthening expedients such as struts, ribbing and the like.

Cap 10 further comprises a stepped or flanged portion 16. Stepped or flanged portion 16 provides several discrete functions. Externally, stepped portion 16 provides seating and support for mounting cap 10 to cooler 12. If properly sized, cap 10 could be mounted upon cooler solely by press or interference fit. Normally, however, securement means, such as bolts, screws, brackets, clamps and the like are employed to more securely mount and fasten cap 10 to cooler 12. Toward this end, apertures 18 are provided in stepped portion 16 for receiving such screws, bolts, clamps and other similar fasteners. Any fasteners known to the art may be employed.

As shown in FIG. 1 cap 10 extends downwardly over cooler 12 only so far as to be minimally supported and retained thereon. Air flow and access to louvered side panels 20 of cooler 12 is unimpeded by cap 10.

Internally, cap 10 comprises mold portion 22. Mold portion 22 comprises the cavity formed by the internal surfaces of stepped portion 16 in cooperation with liner 24. Mold portion 22 receives poured or injected thermal insulation 26, for example, polyurethane foam (R=7 for a thickness of 1") or any other suitable insulation. In practice, thermal insulation 26 is applied to mold portion 22 by an injection or poured process and thus ultimately adheres to cap 10. Additionally, any suitable thermal insulation known to the art may be utilized.

Prior to insertion of insulation 26 into mold portion 22, liner 24 is positioned over the mold cavity. Liner 24 thus provides a mold cover, as well as covering and protecting insulation 26. Liner 24 may comprise, for example, a sheet of any suitable plastic, cardboard, or the like. Liner 24 further comprises an internal planar extension of the "step" of stepped portion 16.

In fabricating cap 10, liner 24 is positioned over mold portion 22 before or during injection of insulation 26. Upon setting of insulation 26, cap 10 comprises a rigid integral, one-piece shell, liner and insulation structure.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. An integral one-piece insulating cap means for evaporative coolers comprising a shell portion comprising a top portion, a stepped portion and a mold portion;

said stepped portion comprising means for mounting said insulating cap; and said mold portion comprising means for integrally molding thermal insulation therein.

2. The insulating cap of claim 1 wherein said top portion further comprises reflective material.

3. The insulating cap of claim 1 wherein said shell portion is selected from the group of materials consisting of polyethylene, polyisocyanurate, ABS, vinyl, and glass fiber.

4. The insulating cap of claim 1 wherein said shell portion is selected from the group of materials consisting of thermoplastic and thermosetting plastic.

5. The insulating cap of claim 1 wherein said top portion comprises strengthening means.

6. The insulating cap of claim 1 wherein said flanged portion comprises means for mounting said insulating cap on an evaporative cooler.

7. The insulating cap of claim 1 wherein said flanged portion and said top portion internally comprise a mold portion.

8. In the insulating cap of claim 7 wherein insulation is molded within and adhered to said mold portion.

9. An insulating cap apparatus in combination with a cooling device, said apparatus comprising:

means comprising a molded plastic shell comprising ultraviolet inhibitors;

means comprising insulation molded within and adhering to said shell; and means for securing said shell to the cooling device.

10. The apparatus of claim 9 wherein said molded plastic shell comprises a shell molded from material selected from the group consisting of polyethylene, polyisocyanurate, ABS, vinyl, and glass fiber.

11. The apparatus of claim 9 wherein said molded plastic shell comprises material selected from the group of thermoplastic plastics and thermosetting plastics.

12. The apparatus of claim 9 wherein said molded plastic shell comprises reflective material.

13. The apparatus of claim 9 wherein said insulation molded within and adhering to said shell comprises polyurethane foam.

14. The apparatus of claim 9 wherein said shell comprises a top portion and a flanged portion.

15. The apparatus of claim 14 wherein said top portion and said flanged portion comprise a mold portion.

16. The apparatus of claim 15 wherein said mold portion comprises a liner.

17. The apparatus of claim 14 wherein said means for securing said shell to the cooling device comprises securing means in said flanged portion.

\* \* \* \* \*